United States Patent [19]
Joyce

[11] 3,745,338
[45] July 10, 1973

[54] VOLUMETRIC MEASURING METHOD AND APPARATUS

[75] Inventor: William B. Joyce, Columbus, Ohio
[73] Assignee: Industrial Nucleonics Corporation
[22] Filed: Aug. 17, 1964
[21] Appl. No.: 390,002

[52] U.S. Cl. .......... 250/43.5 FL, 73/149, 250/106 T
[51] Int. Cl. ........................................... G01n 23/12
[58] Field of Search ................ 250/43.5 D, 43.5 FL, 250/43.5 FC, 43.5 R, 106 IL, 106 T, 83.6 FT; 73/149

[56] References Cited
OTHER PUBLICATIONS

Apparatus for Measuring Human Body Volume, by W. E. Siri, from Rev. of Scientific Instruments, Vol. 27, No. 9, Sept. 1956, pgs. 729–738.

*Primary Examiner*—Archie R. Borchelt
*Attorney*—William T. Fryer, III, James J. O'Reilly and Cushman, Darby & Cushman

[57] ABSTRACT

Ullage volume of a container containing a fluid is determined by injecting a known quantity of radioactive material into the ullage volume. After the radioactive material has dispersed uniformly throughout the ullage volume the density thereof is measured to provide the ullage volume indication. The system can be utilized to monitor the amount of fuel in the container under either zero G or a gravitational field. The ullage volume indication can be compensated for pressure variations within the volume by utilizing a pressure transducer having an output that is combined with the detected density. A system is provided to compensate for background radiation noise. The system can also be utilized to detect leakage from the container by noting changes in concentration of the radioactive material. Corrections for temperature variations are also provided. In fixed volumes systems, the device can be utilized to monitor pressure and temperature variations.

43 Claims, 10 Drawing Figures

Inventor
William B. Joyce
By James J. O'Reilly
Agent

Patented July 10, 1973 3,745,338
2 Sheets-Sheet 2
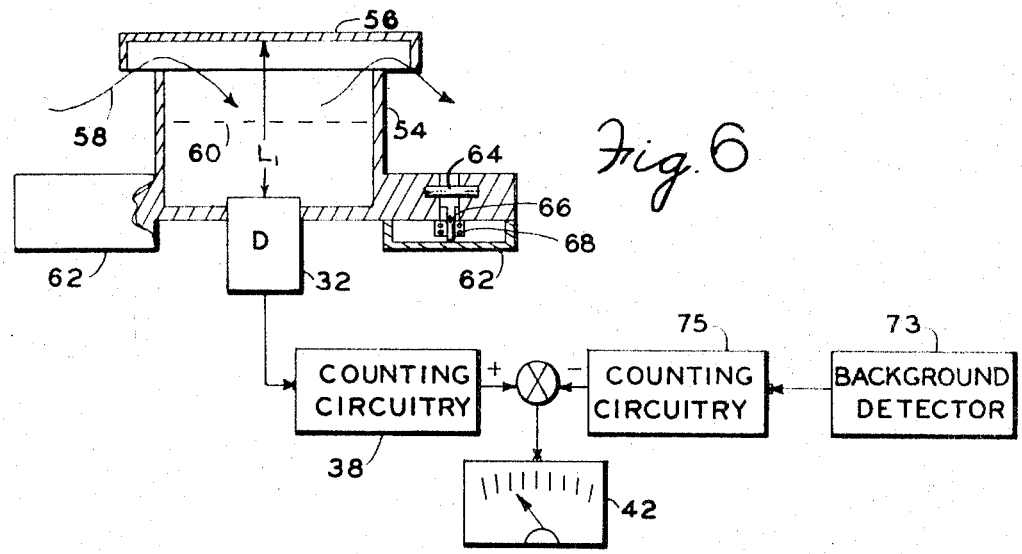
Fig. 6
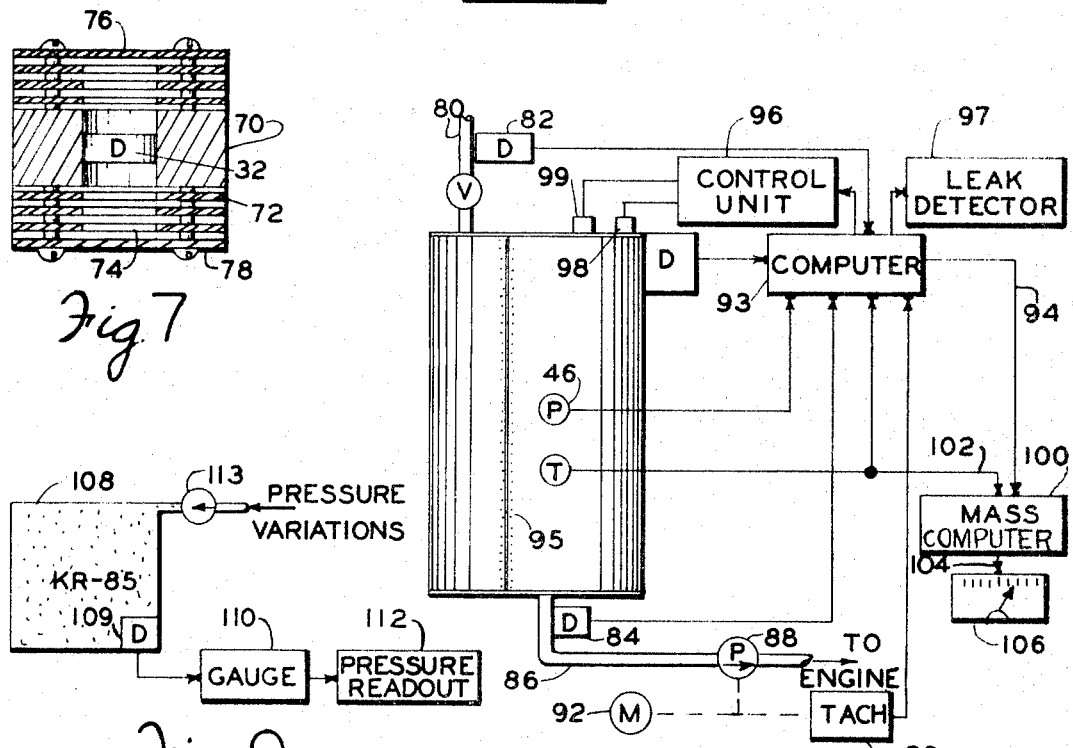
Fig. 7
Fig. 8
Fig. 9
Fig. 10
Inventor
William B. Joyce
By James J. O'Reilly
Agent

VOLUMETRIC MEASURING METHOD AND APPARATUS

This invention relates generally to volumetric gauging apparatus and more particularly to a novel method and means for determining the capacity of an irregular volume by means of an identifiable tracer.

Many times it is required to measure the total volume defined by a rigid body. One example is found in subterranean surveying where the volume of a salt-lined cavern must be known if it is to store natural gas. Another example exists where the total interior volume of ceramic evaporator plates must be determined. While in these cases the volume is irregular, it is fixed by the rigid walls of the surrounding medium. Suppose, however, in the first example after the cavern is surveyed, that it is partially filled with a liquid such as oil. Then the volume of the space above the oil will be a measure of how much oil remains. This unfilled space is commonly referred to as ullage. When the total volume of a container is known, a ullage measurement yields useful fill information.

Several methods have been tried to solve the volumetric gauging problem. Sometimes a gas is pumped into the cavity and its volumetric flow rate is integrated until a sharp increase in pressure is noted. This indicates that the unknown volume is completely occupied by the filling gas and the unknown volume is equal to the volume of gas pumped into the cavity. Other methods rely on the phenomenon of acoustical resonance. Since the resonant frequency of a cavity is dependent upon the volume thereof, sound energy of that frequency coupled into the cavity will be reinforced while those waves of a different frequency will not. Generally, the volume will be inversely proportional to frequency. Another method is described in a June 1952 ASTIA report ATI 166,433 entitled "Investigation of Fuel Quantity Measuring Technique." Here, in the vapor above fuel in a tank, a small reference volume is established into which the ullage can flow. A microphone is mounted in this reference volume and another is placed in the main ullage to determine the ullage volume, the standard volume is isolated from the ullage and a pair of pistons cooperate to compress the vapor in each volume by a known incremental amount. At the end of compression, the pressure in each volume is measured by the microphone sensors. The fuel volume is proportional to the difference in the respective pressures. Primarily, since these methods rely on mechanical interactions with the measurand, most are extremely inaccurate and awkward to use in most environments.

In accordance with my invention, I release into the unknown volume a known amount of an identifiable tracer such as a radioactive gas that will disperse uniformly throughout the region to be measured. I then measure the concentration of the tracer, i.e., the amount of tracer per unit volume. In this respect concentration may be considered synonymous with density. Since the mass of the material diffused is known, its density will be inversely proportional to the unknown volume into which it spread. Moreover, the measurement will be insensitive to substantial pressure changes in the volume's resident gas since the transducer will respond principally to the radioactive tracer or probe gas.

In a specific embodiment, my invention finds particular utility as a liquid propellant gauge for rocket propulsion systems such as used in space vehicles designed for sub-orbital, orbital or interplanetary travel. In these systems, it is common to expel the fuel with a pressurant gas acting either directly against the surface of the propellant or against a diaphragm. In some cases, the vapor pressure of the liquid propellant itself is sufficient to expel the fuel. Therefore, if no diaphragm is used the ullage includes both propellant vapor and perhaps pressurant gases. When the system enters a zero-g environment, the propellant becomes weightless and may assume a variety of surface configurations. Some of the ullage may be trapped in the fuel and effectively isolated from the above-described prior art sensing devices. My gauging method is not dependent on the fuel-ullage interface configuration. During pre-launch, or later, I inject a known number of curies of a radioactive gas such as krypton 85 into the ullage space above the fuel and mount a radiation detector in communication with the ullage. The maximum distance that radiation will travel before it is absorbed is inversely proportional to the density of the resident gas. My detector responds only to the radiation of those atoms located less than this distance away and thus, in effect, measures the number of curies in a known sample volume of the ullage. Alternatively, a sampling volume can be mechanically established by substantially enclosing the detector in shielding that prevents radiation external to the measuring volume from entering the detector. I further provide means for correcting the detector output in the event the probe gas is partially soluble in the fuel or lost through a leak in the system. Corrections are also made for temperature and pressure variations that may affect the system under certain conditions.

Accordingly, it is a primary object of the present invention to provide a novel method for measuring the interior of either a regularly or an irregularly shaped container.

It is another object of the present invention to provide a volume gauge for tankages that is independent of the surface configuration assumed by the stored product.

It is also an object of the present invention to provide a ullage measuring system that is insensitive to a large degree to changes in the pressure of the resident gas.

It is a further object of the present invention to provide a volume gauge that does not depend on moving mechanical parts subject to wear.

It is still another object of the present invention to provide a volume gauge that is simpler and more compact in construction than similar devices used heretofore.

It is yet another object of the present invention to provide a volume gauge that is more accurate and reliable than similar devices currently in use.

These objects as well as other features of the present invention will become more apparent upon reference to the following description when taken in conjunction with the accompanying drawings, in which:

FIG. 6 is a sectional view of a shielded detector;

FIG. 7 is a sectional view of an improved shielded detector;

FIG. 8 is a block diagram of a complete fuel gauging system constructed in accordance with the present invention;

FIG. 9 is an alternative embodiment of the present invention for measuring pressure; and FIG. 10 is another embodiment comprising a temperature gauging system.

Figure 1:
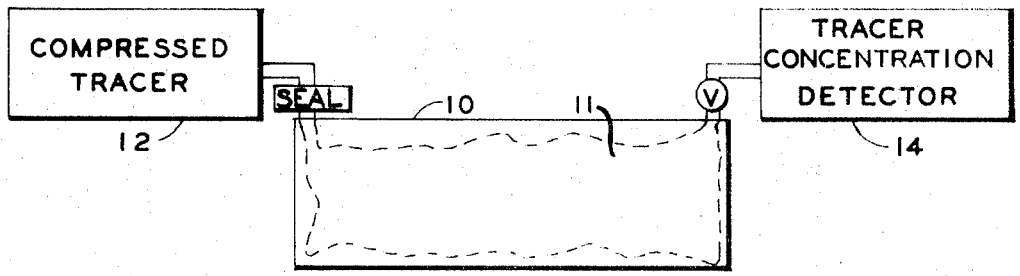
FIG. 1 is a diagrammatic view illustrating the volumetric gauging method of the present invention.

With reference now to the drawings and particularly to FIG. 1, the irregularly shaped interior volume of a body 10 is measured in accordance with the present invention by releasing into the interior 11 from a cell 12 a known amount of a probe gas such as hydrogen, chlorine or other identifiable substance. The probe gas eventually will diffuse throughout the interior by intermingling with whatever gases resided there before the release of the probe gas. In the simple diffusion of one gas into another, the concentration of either component obeys the following partial differential equation:

$$(\delta C/\delta t) = (\delta/\delta x)(D\delta C/\delta x) + (\delta/\delta y)(D\delta C/\delta y) + (\delta/\delta z)(D\delta C/\delta z)$$

(1)

where $C$ is the concentration of the gas component, $t$ is time, $x$, $y$ and $z$ are position coordinates and $D$ is the diffusion coefficient. After a sufficient length of time has passed, the concentration gradients vanish and diffusion is complete.

Since a known amount of gas m has spread throughout an unknown volume, the concentration C of the probe gas will be inversely proportional to the unknown volume V according to $$C_{final} = m/V$$

(2)

A detector 14 communicating with the interior 11 is responsive only to the concentration of the probe gas. Detector 14 can be any of the commercially available halogen detectors or other detector responsive to the probe gas being used. It should be apparent, however, that a probe gas not already present or residing in the interior volume should be selected; otherwise, m is not known precisely. Alternatively, the interior can be exhausted of all resident gases before injection of the probe gas. It should be apparent that the known mass m must occupy the unknown volume V. Error may result if the walls absorb some of the test gas.

Figure 2:
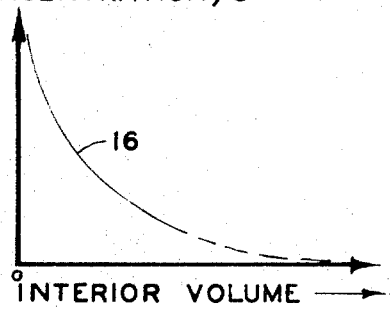
FIG. 2 is a graph illustrating the response of the detector used in the method shown in FIG. 1.

FIG. 2 graphically shows the response of a typical concentration detector. The slope of characteristic 16 is representative of the sensitivity of the measuring method and can be made quite large by careful choice of probe gas and detector type. One particular selection I have found desirable is a beta-emitter such as krypton 85. Other radioisotopes of different energy and type of radiation may be more suitable in certain low-temperature gauging environments; however, this radioisotope, in relatively small quantities, when measured by an inexpensive radiation detector, yields an extremely accurate volume gauge. This combination is described in the following embodiment of the present invention wherein its utility will become immediately evident.

Figure 3:
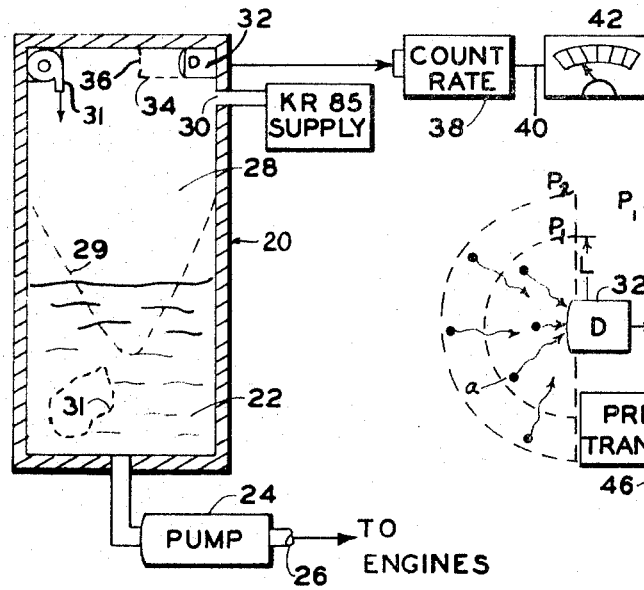
FIG. 3 is a sectional view partly diagrammatic of a fuel gauging system using a radioactive tracer.

The measurement of an irregular volume is intimately related to the measurement of fuel in a tank of a space vehicle subjected to periods of weightlessness or zero gravity that cause the fuel to randomly orient itself in the tank. A typical fuel tankage is illustrated in FIG. 3. A tank 20 contains a quantity of fuel 22 that is pumped at 24 through an outlet conduit 26 to the rocket engines. Into the ullage space 28 above the fuel is injected a known mass of krypton 85 through an inlet 30. The radioisotope will diffuse uniformly through the tank ullage by mixing with the fuel vapor. The amount dissolving into the propellant itself will normally be insignificant. In other systems, a pressurant gas may also be present in the ullage to force the fuel out of the tank 20. It may be desirable to provide a blower 31 to hasten the diffusion of the radioisotope. Tritium, a radioisotope of hydrogen, may be used instead of krypton 85, especially in the measurement of very low temperature liquid fuel tankages.

As the fuel supply decreases, the ullage volume increases. Since the amount of radioisotope is fixed at a certain number or fraction of a curie, the curie density of the ullage must necessarily diminish. Curie density is defined for the purpose of this disclosure as a count rate per unit volume. This is related, of course, to the number of radioactive atoms per unit volume. The ullage curie density is independent of the fuel-vapor interface shape. For example, neither the paraboloidal interface shape 29 nor the trapped ullage bubble 31 alter the curie density, of the ullage, provided there is no entrapped ullage at the time of injection. The fuel-vapor interface would assume the shape 29 whenever there is a simultaneous thrust and rotation about the long axis of the tank 20. To sample the ullage, a radioactive detector 32 is mounted inside the tank to measure the radioactivity in a small known volume 34 of ullage outlined by the dotted line 36. Alternatively, the detector could be mounted outside the tank if the ullage mixture could still be sampled. It is important, however, that the fuel 22 be kept out of the sampling volume because it will significantly reduce the amount of detected radiation due to its relatively high radiation absorption capability. Construction will be described hereinafter that effectively eliminates this problem. A conventional count rate circuit 38 is connected to the detector 32 to provide a signal on line 40 proportional to the counts per second, N, generated in the detector 32 by the radioactivity in the sample volume 34. The count rate N can be expressed as follows:

$$N = km_s/V_s$$

(3)

where $m_s$ is the mass of radioactive tracer in the sampling volume $V_s$ and $k$ is a constant of proportionality. Each curie of tracer in the sample volume will provide $3.7 \times 10^{10}$ disintegrations per second. Other radiation apparatus such as an ion current device would operate in my invention with equal utility.

Figure 4:
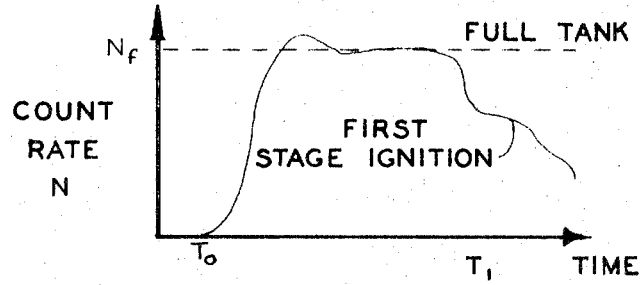
FIG. 4 is a graph of count rate vs. time for the radiation measuring system shown in FIG. 3.

Referring briefly to FIG. 4 the count rate N may experience a transient rise after injection at time $T_0$. Shortly, the count rate levels off at $N_f$ which is indicative of a "full" tank. Of course, some ullage space must always exist in the vicinity of the detector. At launch time $T_1$, fuel is withdrawn from the tank and the count rate decreases. A meter 42 connected to the count rate circuit 38 could be used to register the count rate. Accordingly, the face of meter 42 may be calibrated directly in units of fuel volume.

The system will be accurate despite any complicated fuel-vapor interface configuration that may develop during zero-g or normal flight maneuvers because the curie density of the ullage is not dependent on what shape the fuel is in. The total ullage volume remains constant and changes only when fuel is withdrawn or where there is a leak. A leak may be detected by observing the count rate when no fuel is being used. If a leak is detected, it will be necessary to fix it and establish another reference for the tank for changes in the remaining fuel. It may be desirable to "recharge" the ullage anyway to increase the detector signal at low fuel levels.

I also provide compensation for adverse changes in the temperature and the pressure of the system that might be reflected in the count rate. For example, a decrease in the temperature increases the solubility of the probe gas thereby decreasing the observed count rate. This problem does not obtain, of course, in those tanks using a diaphragm, i.e., bladder. Similarly, an increase in pressure increases the amount of absorber between the source and the detector, thereby decreasing the count rate N. If the fuel is assumed to be of negligible solubility over the expected range of temperatures, only the problem of high pressure remains. In a practical situation, the reference volume would be made sufficiently small so that for the range of pressure normally encountered, negligible absorption occurs in the resident gas. If a sensitivity problem would arise because of the small sampling volume, either multiple sample volumes or a more penetrating radioactive gas could be used.

According to the ideal gas law, pressure P, volume $v$, and temperature T are related by $$Pv = nRT \quad (4)$$

where $n$ is the number of moles of gas in the volume $v$ and R is a gas constant. My gauge measures the density $n/v$ of the radioactive tracer. If either temperature or pressure is fixed or known, the other is uniquely determined. Some functional relationship other than the one stated by equation (4) may apply in a non-ideal gas situation. Besides affecting the solubility of the tracer gas in the fuel, temperature variations cause dimensional changes in the tank and density changes in the propellant being used. Correction devices to eliminate temperature-excited errors are described hereinafter.

Figure 5:
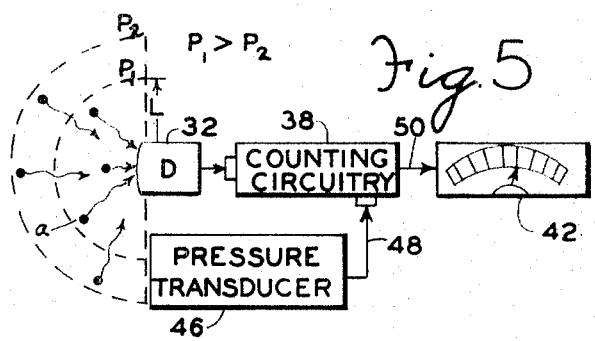
FIG. 5 is a more detailed schematic view of a shieldless detector illustrating the dependence of detector range upon pressure.

FIG. 5 shows schematically how an unshielded detector may be responsive to pressure variations. Assuming a pressure $P_1$, radiation from any particular atom a will travel, on the average, a distance L before it is for all practical purposes absorbed by the vapor. If the detector 32 has a viewing angle of 180°, it will respond to those atoms located within a hemispherical volume of radius L. The sampling volume $v$ may be defined by the following equation:

$$V = \tfrac{1}{2} \times (4/3) \times \pi \times L^3 = 2\pi L^3 / 3. \quad (5)$$

However, if the pressure should drop to the value $P_2$, while the density of the radioactive atoms was held constant, the effective range of the radiation is increased. Atoms not counted before are now sampled. The meter 42 will register a higher count rate than would be representative of a higher gas concentration. But, in fact, the concentration did not change, since there is substantially the same number of radioactive atoms per unit volume as before the pressure change. If necessary to correct the fuel gauge for pressure variations, a pressure transducer 46 could be used to monitor the ullage pressure and generate an electrical signal on line 48 that will correct the counting circuit output signal on line 50. The meter 42 will then be substantially insensitive to pressure changes occurring in the ullage and will accurately indicate the concentration of radioactive atoms in the ullage.

Alternatively, a mechanical fabrication to rigidly define the sampling volume can be constructed as shown in FIG. 6. In this embodiment, the face of detector 32 communicates with the interior of an open top housing 54 having a top plate member 56. The walls of the housing 54 and the plate member define a rectilinear volume into which the radioactive ullage may flow as indicated by the streamlines 58. If the radiation path length is much greater than the depth $L_1$ of the sampling volume, the detector responds to all the radiation originating in the sampling volume. At very high pressures, radiation from beyond the dotted line 60 may not make it to the detector 32, and the volume sampled is correspondingly smaller. This being the case, a smaller curie density will be measured and unless a pressure correction is made an erroneous indication of ullage volume will be made. Therefore, a pressure sensing correction system must be utilized whenever the ullage pressure becomes so high that the fixed sampling volume measurement of the ullage provided by the housing 54 is circumvented. It is apparent, however, that the shielded detector will be insensitive to pressure variations below a certain maximum value determined in accordance with the magnitude of the sampling volume.

Attached to either side of the detector housing 54 may be a pair of source dispersal units 62, one being a spare. Each unit includes a frangible capsule 64 containing the radioactive substance to be dispersed. A pin 66 driven by a solenoid 68 may be used to rupture the capsule 64 and effect the aforesaid diffusion of radioactive substance in the ullage. The entire source-detector assembly may be mounted directly in the tank wall or otherwise coupled into the interior of the tank.

Operation in outer space may pose several problems. one may be the high radiation levels in certain regions or belts that tend to mask the response of the measuring detector 32 in background "noise." To eliminate this problem the output of a second detector 73 responsive to background radiation only and an associated counting circuit 75 is subtracted from the ullage count. The difference may be indicated on meter 42. This technique of eliminating background radiation is the subject of a copending application Ser. No. 148,594, filed Oct. 30, 1961, and assigned to the same assignee as the present invention.

It may be a problem keeping the fuel itself from contaminating the detector. To keep the fuel out of the detector and yet permit free circulation of the ullage vapors therearound, the apparatus shown in FIG. 7 may be constructed. Here the detector 32 is mounted within a cylindrical member 70 located in between a plurality of vertically stacked wafers 72 each having a centrally located hole 74. The wafers are spaced from one another to allow the ullage gas to flow into the sampling volume more or less defined by the aligned holes 74 and a pair of solid end plates 76 and 78. It is apparent that better ullage circulation is provided by this construction. If the entire assembly should be submerged in a cohesive fuel in the absence of gravity, none should penetrate the sampling volume, since, in order to do so, a large area of fuel would necessarily have to spread out and a somewhat larger system energy than a minimum surface energy would prevail. The tendency, of course, is for the fuel to assume that configuration that provides the minimum surface energy. Should droplets of fuel enter the samplinG volume, a blast of compressed air would serve to clear them from the sampling volume. Vibratory techniques may be equally useful. Shutter devices that temporarily close off the sampling volume may also be employed.

It is evident from the above that factors other than fuel expenditure may effect a decrease in curie density. For example, some of the radioactive ullage, $M_1$ may be lost through venting of the tank, another portion, $M_2$ may dissolve into the fuel itself and an amount $M_3$ may leak through holes caused either by micrometeorites or faulty tank construction practices. If $M_o$ is the total mass of radioactive substance injected originally into the ullage, the amount M in the ullage during flight may be expressed as follows:

$$M = M_o - (M_1 + M_2 + M_3)$$

Referring now to FIG. 8, the amount $M_1$ can be measured by detecting the radiation leaving the vent 80 by means of a detector 82. The amount $M_2$ can be detected by either a detector submerged in the fuel or a detector 84 monitoring what radioactivity is lost with fuel forced out of the output pipe 86 by a pump 88. In either case, the total mass of radioactive substance lost will be a product of the density, the cross-sectional area, and the volumetric flow rate of the respectively monitored flows integrated in time. The venting flow rate may be assumed to be constant but the fuel flow rate may be quite variable but measurable, for example, either by a tachometer 90 geared to a pump driving motor 92 or by taking the time derivative of the subject fuel gauge output signal. A computer 93 receives information from the various detectors and sensors and provides a signal on line 94 that is proportional to the volume of fuel in the tank and corrected for all the variables affecting the computation. Especially if there is for any reason a drop in detector counting rate when no fuel is being used, a control unit 96 may be energized by the computer 93 to cause an indication on indicator 97, and actuation of one or both standby source dispersal units 98, 99. For example, if a leak should be detected in a seam 95 and repaired, an unknown amount of fuel would remain in the tank. After the repair, a count rate $N_A$ is detected. The dispersal unit 98 would release a quantity of gas that would produce by itself a count rate $N_B$. The total count rate is $$N = N_A + N_B$$

Therefore, since $N_A$ is known, $N_B$ can be deduced by subtracting $N_A$ from N. This is just the same effect as if the number of curies were increased by a factor of $(N_A + N_B)/N_B$ over what it would have been were the $N_B$ count rate used alone. This provides a constant correction to the computer 93 from the design calibration curve of the B source when expressed as a percent rather than in terms of an absolute number of counts. What amounts to a change in measuring system gain may be further useful on long missions in compensating for the half-life decay of the radioactive tracer.

The temperature of the system may also vary between wide extremes during flight so a temperature sensor T can be located on the tank to provide a correction signal to the measuring system. For example, corrections should be made for any thermally-excited changes in fuel tank dimensions. Since the density of the fuel is proportional to temperature, sensor T also may correct the computation of fuel mass, should such be desired. The system normally determines fuel volume by measuring the ullage volume but the total fuel mass is simply the product of the fuel density and the fuel volume. It is often more desirable to know the total fuel mass remaining rather than the volume thereof. Accordingly, a mass computer 100 temperature-corrected by the signal on line 102 provides a total fuel mass signal and line 104 the magnitude of which is indicated by the meter 106.

It will be apparent that while in a preferred embodiment of my invention, I measure a changing volume and correct for temperature and pressure, that my method will measure either pressure or temperature when one or the other is held constant in a system of fixed volume.

Referring briefly to FIGS. 9 and 10 in a fixed volume 108 located in an isothermal environment my invention will respond to the total pressure variations of the resident gas. Because of the aforesaid absorption as the pressure increases, the range of radiation becomes shorter and the response of curie density detector 109 drops off. To this end, a gauge 110 and an indicator 112 may be used to develop the pressure-functional readout. Of course, a one-way valve 113 or other filtering device is necessary to prevent any radioactive gas from being lost. Conversely, in an isobaric environment, such as might be provided by a pressure regulator unit 114, a curie density detector 116, gauge 118 and an indicator 120 will provide a readout of temperature variations occasioned by any increase or loss of thermal energy Q as indicated schematically by the large arrow 122.

In most cases described above, the tracer disperses throughout the ullage of a partially filled vessel. It may be desirable to use a tracer that dissolves into and diffuses primarily through the fill material. Then a curie density measurement performed on the fill material will provide a signal proportional to the volume of fill; however, a more penetrating radiation should be used since there will be a much greater attenuation in the fill than in the ullage. Moreover, this is a one-time only measurement, since the density will not change when fill is removed from the vessel.

While I have described my invention in terms of several preferred embodiments, only those additions and modifications falling within the scope of the appended claims are within the spirit of my invention.

I claim:

1. The method of determining the volume of a region in a container containing an ullage region and a fluid occupying the remainder of the container comprising the steps of:

injecting a known amount of radioactive material not otherwise present into said ullage region that disperses throughout said ullage region and does not substantially mix with the fluid, measuring with a detector for the radioactive material the density of said injected material after said material has uniformly dispersed throughout said ullage region and while the material is in the ullage region, and correlating said measured density of said dispersed material with the volume of one of said regions.

2. The method of determining the volume of a void region in a container comprising the steps of:

injecting a known amount of an identifiable radioactive gas not otherwise present into said region that disperses throughout said region, measuring with a detector for the radioactive gas the density of said injected gas in said void region after said gas has dispersed uniformly throughout said region, and correlating said measured density of said dispersed gas with the volume of said region.

3. The method of determining the volume of a void region in a container comprising the steps of:

injecting a known amount of radioactive material into said region that disperses throughout said region, measuring the density of said injected radioactive material in said void region after said material has dispersed uniformly throughout said region, and correlating said measured density of said radioactive material with the volume of said void region.

4. The method of determining the volume of a void region in a container comprising the steps of:

injecting a known amount of radioactive material into said void region, establishing a sampling volume of known magnitude in said void region, measuring the amount of said radioactive material in said sampling volume, and correlating said measured amount of radioactive material with the volume of said void region.

5. The method of determining the volume of a void region in a container comprising the steps of:

injecting a known amount of radioactive gas into said void region, establishing a sampling volume of known magnitude in said void region, measuring the radiation emanating from said sampling volume, and correlating said measured radiation with the volume of said void region 6. The method of determining the volume of a void region comprising the steps of:

injecting a known number of curies of radioactive material into said void region that disperses throughout said region, measuring the curie density of said material in said void region after it has dispersed throughout said void region, and correlating said measured curie density of said dispersed material with the volume of said void region.

7. The method of determining the volume of fuel remaining in a tank of known volume comprising the steps of:

injecting a known amount of radioactive gas substantially insoluble in said fuel into said tank that disperses throughout said tank, measuring the density of said injected gas in said tank after it has diffused throughout said tank, and correlating said measured density of said diffused gas with the volume of said fuel.

8. The method of determining the volume of fuel remaining in a tank of known volume comprising the steps of:

injecting a known amount of radioactive gas insoluble in said fuel into said tank, measuring the density of said radioactive gas after it has diffused throughout said tank to determine the ullage volume of said tank, and comparing said ullage volume measurement together with said known total tank volume to obtain said fuel volume.

9. The method of determining the volume of a region occupied by a resident fluid material comprising the steps of:

introducing a fixed amount of a radioactive probe fluid into said resident fluid to diffuse said probe fluid throughout said volume, measuring with a detector for the radioactive fluid the density of said diffused probe fluid in said region, and correlating said measured fluid density with the volume of said region.

10. The method of determining the volume of material contained in a partially filled vessel of known volume, comprising the steps of:

introducing a radioactive gas into the volume of said vessel not occupied by said material that disperses throughout said non-occupied volume, measuring the density of said gas in said non-occupied volume after it has diffused throughout said volume, and correlating said measured density of said radioactive gas with the volume of said material in said vessel.

11. The method of determining the volume of material contained in a partially filled vessel of known volume comprising the steps of:

introducing a radioactive test gas into the ullage volume of said vessel, measuring the density of said gas in said ullage volume to obtain a first signal having a first component proportional to said ullage volume and a second component proportional to the amount of gas dissolved in said material, measuring the amount of said gas dissolved in said material, and combining said measurements in accordance with a predetermined relationship to derive an output signal proportional to the volume of material in said vessel.

12. The method as set forth in claim 11 but further including the steps of:

measuring the temperature and pressure of said ullage volume, and correcting said output signal in accordance with said temperature and pressure measurement.

13. The method as set forth in claim 11 but further including the steps of:

detecting leaks in said vessel, stopping said leaks, measuring the density of said radioactive ullage after said leaks are stopped, introducing a second test gas of known quantity into said ullage volume, and measuring the density of said ullage after introduction of said second test gas.

14. The method of investigating a system having a resident gas for changes in variable parameters such as volume, pressure or temperature, comprising the steps of:
injecting a known amount of radioactive tracer into said gas that diffuses throughout said gas,
measuring the density of said injected tracer after said tracer has uniformly diffused throughout said resident gas, and
correlating said measured density with one of said variable parameters.

15. The method of determining the pressure of a resident gas in a region of fixed volume and temperature comprising the steps of:
injecting a radioactive tracer gas into said resident gas,
said tracer diffusing uniformly throughout said resident gas, and providing radiation having a range of penetration that is a function of said resident gas pressure, and
deriving a signal proportional to said range of radiation penetration for indicating the pressure of said resident gas.

16. The method of determining the temperature of a resident gas in a region of fixed volume and pressure comprising the steps of:
injecting a radioactive tracer gas into said resident gas,
said tracer diffusing uniformly throughout said resident gas and providing radiation having a range of penetration that is a function of said resident gas temperature, and
deriving a signal proportional to said range of radiation penetration for indicating the temperature of said resident gas.

17. The method of determining a leak in a normally closed system comprising the steps of:
injecting a known amount of radioactive tracer into said system to diffuse the same uniformly throughout,
measuring the density of said tracer in said system after diffusion while the system remains closed except for the leak, and
indicating any decreases in said measured tracer density.

18. Apparatus for determining the volume of a void region in a container comprising:
means for releasing a known quantity of identifiable radioactive material into said volume,
said material being uniformly distributed throughout said volume, and
a detector for the radioactive material for measuring the density of said uniformly distributed identifiable material in said void region.

19. Apparatus for determining the volume of a void region comprising:
means for dispersing a known amount of radioactive material throughout said void region,
a radiation detector for measuring the density of said radioactive material dispersed in said void region, and
means for indicating said radioactive density measurement.

20. Apparatus for determining the volume of a void region comprising:
a fixed quantity of an identifiable radioactive tracer,
means for injecting said fixed quantity into said void volume to uniformly disperse said tracer, and
detector means for the radioactive tracer responsive to the density of said tracer in said void region for providing a signal that is a function of said volume.

21. Apparatus for measuring the amount of material in a container of known volume comprising:
means for injecting a known quantity of a radioactive identifiable substance into the ullage volume of said container that disperses through said ullage volume,
detector means for the radioactive tracer for measuring the density of said identifiable substance in said ullage, and
means for correlating said density measurement with said material fill.

22. Apparatus for measuring the amount of fuel in a tank of known volume comprising:
a radioactive tracer,
means for injecting a known amount of said tracer into the ullage of said tank to establish a density that is a function of said fuel volume,
a radiation detector responsive to said tracer density and providing an output signal in accordance therewith, and
means for indicating said output signal.

23. Apparatus for measuring the amount of fuel in a tank of known volume comprising:
a source of radioactive tracer emitting radiation,
means for injecting a known amount of said tracer into the ullage of said tank to establish a uniform tracer density throughout said ullage varying in accordance with the volume of said ullage,
a detector for measuring the radiation originating in a specific volume of said ullage volume and generating an output signal in accordance therewith, and
means for indicating said output signal.

24. Apparatus as set forth in claim 23 in which said specific volume detector includes:
a generally hollow housing of shielding material mounted in said ullage volume and having openings to permit said ullage to circulate therethrough, and
a radiation sensor located inside said housing to receive radiation emitted only by the amount of said tracer located within the housing.

25. Apparatus for measuring the amount of fuel in a tank of known volume comprising:
a radioactive tracer emitting radiation,
means for injecting a known amount of said tracer into the ullage of said tank to establish a uniform tracer density throughout said ullage varying in accordance with the volume of said ullage,
a detector for measuring the amount of radiation in a known volume of said ullage and generating a first signal that is a function of said fuel volume and a function of the pressure of said ullage,
transducer means for providing a second signal that varies in accordance with said ullage pressure, and
means for combining said signals to provide an output signal that is a function only of said fuel volume.

26. Apparatus for measuring the amount of fuel in a tank of known volume comprising:
a radioactive tracer emitting radiation,
means for injecting a known amount of said tracer into the ullage of said tank to establish a uniform tracer density throughout said ullage varying in accordance with the volume of said ullage, a detector for measuring the amount of radiation in a known volume of said ullage and generating a first signal proportional to said fuel volume and the temperature and the pressure of said ullage, temperature transducer means providing a second signal proportional to said ullage temperature, pressure transducer means providing a third signal proportional to said ullage pressure, and computer means for combining said first, second and third signals to provide an output signal that is a function only of said fuel volume.

27. Apparatus as set forth in claim 26 in which said specific volume detector comprises:

a generally hollow housing of shielding material mounted in said ullage volume and having openings to permit said ullage to circulate therethrough, and a radiation sensor located inside said housing to receive radiation emitted only by the tracer occupying said housing.

28. Apparatus for measuring the amount of fuel in a tank of known volume comprising:

a source of radioactive tracer emitting radiation, means for injecting a known amount of said tracer into the ullage of said tank to establish a uniform tracer density throughout said ullage varying in accordance with the volume of said ullage, a detector for measuring the amount of radiation in a known volume of said ullage and generating a first signal proportional to said fuel volume and the temperature and the pressure of said ullage, temperature transducer means providing a second signal proportional to said ullage temperature, pressure transducer means providing a third signal proportional to said ullage pressure, a second detector for generating a fourth signal proportional to the amount of background radiation in the environment of said fuel measurement, and computer means for combining said signals to provide an output signal proportional only to said fuel volume.

29. Apparatus for measuring the amount of fuel in a tank of known volume comprising:

a frangible capsule of compressed radioactive gas mounted in the ullage of said tank, means for rupturing said capsule dispersing a known number of curies of said gas uniformly throughout said ullage, means for measuring the curie density of said ullage including a detector responsive to the radiation of said radioactive gas, a housing for enclosing a fixed sampling volume in said ullage and means for mounting said detector in said housing, said detector providing a first signal proportional to said fuel volume, pressure and the temperature of said ullage volume, and the external radiation existing in the background of said curie density measurement, pressure transducer means providing a second signal proportional to said ullage pressure, temperature transducer providing a third signal proportional to said ullage temperature, a second detector for generating a fourth signal proportional to the intensity of said background radiation, a first computer for combining said signals to provide a first output signal proportional only to said fuel volume, second computer means receiving said output signal and said third signal for providing a second output signal proportional to the mass of said fuel in said tank, and means for registering an indication of said second output signal.

30. Apparatus as set forth in claim 29 wherein said frangible source comprises:

at least one beta-emitting isotope.

31. Apparatus as set forth in claim 29 in which said sampling volume housing comprises:

a center cylindrical shield member having a centrally located bore for mounting said detector, a plurality of washers each having a centrally located bore, means for mounting said washers in vertical alignment on either side of said center cylindrical shield member and in alignment with the detector mounting bore thereof, means for spacing said washers slightly away from one another, and end plate means for securing said mounting means and defining said specific volume with said aligned bores.

32. Apparatus for determining the pressure variations of a gas residing in a fixed interior volume at constant temperature comprising:

means for injecting a radioactive gas into said resident gas, said tracer diffusing uniformly throughout said resident gas and providing radiation having a range of penetration that is a function of said resident gas pressure, and radiation detector means for providing an output signal proportional to said range of radiation penetration for indicating the pressure of said resident gas.

33. Apparatus for determining the temperature of a gas residing in a fixed interior volume at constant temperature comprising:

means for injecting a radioactive gas into said resident gas said tracer diffusing uniformly throughout said resident gas and providing radiation having a range of penetration that is a function of said resident gas temperature, and radiation detector means providing an output signal proportional to said range of radiation penetration for indicating the temperature of said resident gas.

34. Apparatus for determining the volume of one fluid in the presence of another immiscible fluid in a container, said apparatus comprising:

means for injecting into said container a known amount of radioactive substance that preferentially diffuses uniformly throughout only said one fluid, and means coupled with said container for measuring the density of said diffused radioactive substance to provide a signal indicative of the volume of said one fluid.

35. The method as set forth in claim 11 but further including the steps of:

introducing a second test gas of known quantity into said ullage volume, and measuring the combined density of said first and said second test gases.

36. In a volume measuring system, the combination of a container, a fluid occupying a portion of the interior space in said container, means connected to said container for introducing a known mass of radioactive trace gas into the ullage portion of said interior space and detecting means for the radioactive trace gas extending into said container for measuring the density of said trace gas.

37. A method of determining the ullage volume of a partially filled container having a changeable volume of material therein, comprising the steps of:
  introducing a radioactive gas into the volume of said vessel not occupied by said material that disperses throughout said non-occupied volume,
  measuring the density of said gas in said non-occupied volume after it has diffused throughout said volume,
  maintaining the mass of the radioactive gas substantially constant while the determination is being performed and the material volume is subject to change, and correlating said measured density of said radioactive gas with the ullage volume in said vessel.

38. A method of determining the ullage volume of a partially filled container having a changeable volume of material therein, comprising the steps of:
  introducing a radioactive tracer gas into the volume of said vessel not occupied by said material that disperses throughout said non-occupied volume,
  measuring with a radioactive gas detector the density of said gas in said non-occupied volume after it has diffused throughout said volume,
  maintaining the mass of the tracer gas substantially constant while the determination is being performed and the material volume is subject to change, and
  correlating said measured density of said tracer gas with the ullage volume in said vessel.

39. In a volume measuring system, the combination of a substantially closed container, means for providing a mass of ullage gas to said container, means for introducing a known mass of radioactive trace gas into said ullage gas and radioactive gas detecting means extending into said ullage gas for measuring the density of said trace gas.

40. In a system for measuring liquid or gas quantity, the combination of a closed tank, containing a liquid or gas, whose quantity is to be measured, means for providing in said closed tank a mass of ullage gas contiguous with said liquid or gas, means for introducing a known mass of radioactive trace gas into said ullage gas and radioactive gas detecting means extending into said ullage gas for measuring the density of said trace gas.

41. In a liquid quantity measuring system in a G or zero gravitation environment the combination of a closed tank containing a liquid whose quantity is to be measured, means for providing in said closed tank a mass of ullage gas contiguous with said liquid, means for introducing a known mass of radioactive trace gas into said ullage gas and radioactive gas detecting means extending into said ullage gas for measuring the density of said trace gas.

42. In a liquid quantity gauge for a zero gravitational environment the combination of a closed tank having a diaphragm containing a liquid occupying a portion of the interior space in said tank, means for providing a known mass of trace gas into the ullage portion of said interior space and detecting means extending into said ullage space for measuring the density of said gas.

43. In a liquid quantity gauge for a zero gravitational environment the combination of a closed tank having a diaphragm containing a liquid occupying a portion of the interior space of said tank, means for providing in said closed tank an ullage gas to the ullage portion of said interior space in said tank, means for providing a known mass of trace gas into said ullage space and detecting means extending into said ullage space for measuring the density of said gas.

* * * * *